United States Patent [19]
Alkire et al.

[11] Patent Number: 5,885,390
[45] Date of Patent: Mar. 23, 1999

[54] PROCESSING METHODS AND PRODUCTS FOR IRREGULARLY SHAPED BICOMPONENT GLASS FIBERS

[75] Inventors: Roberta L. Alkire, Millersport; Ralph E. Brandon, Newark; Larry J. Grant, Westerville; Todd Green, Somerset; George T. Henry, Newark; Kimberley A. Householder, Pickerington; William S. Miller, Newark, all of Ohio

[73] Assignee: Owens-Corning Fiberglas Technology Inc., Summit, Ill.

[21] Appl. No.: 310,183

[22] Filed: Sep. 21, 1994

[51] Int. Cl.$^6$ .......................... G03B 37/00; B32B 31/00; B32B 35/00

[52] U.S. Cl. .................. 156/62.8; 156/62.2; 156/148; 28/104

[58] Field of Search .......................... 28/104; 156/148, 156/62.2, 62.8

[56] References Cited

U.S. PATENT DOCUMENTS

| | | |
|---|---|---|
| 1,828,217 | 10/1931 | Barker, Jr. . |
| 1,943,258 | 1/1934 | Harshberger . |
| 2,197,562 | 4/1940 | Reinker . |
| 2,209,850 | 7/1940 | Shand et al. . |
| 2,230,272 | 2/1941 | Slayter . |
| 2,313,630 | 3/1943 | Dockerty . |
| 2,333,218 | 11/1943 | Pazsiczky . |
| 2,344,601 | 3/1944 | Collins . |
| 2,411,326 | 11/1946 | McMillin et al. . |
| 2,571,334 | 10/1951 | Browne . |
| 2,602,967 | 7/1952 | Wise . |
| 2,693,668 | 11/1954 | Slayter . |
| 2,722,718 | 11/1955 | Siu . |
| 2,824,610 | 2/1958 | Schubert et al. . |
| 2,871,911 | 2/1959 | Goldsworthy et al. . |
| 2,927,621 | 3/1960 | Slayter et al. . |
| 2,931,076 | 4/1960 | Clark . |
| 2,940,134 | 6/1960 | Heritage . |
| 2,990,004 | 6/1961 | Sowers et al. . |
| 2,998,620 | 9/1961 | Stalego . |
| 3,073,005 | 1/1963 | Tiede . |
| 3,149,944 | 9/1964 | Leaman . |
| 3,161,920 | 12/1964 | Stalego . |
| 3,301,930 | 1/1967 | Boggs . |
| 3,328,142 | 6/1967 | Levecque . |
| 3,338,777 | 8/1967 | Irwin et al. . |
| 3,556,888 | 1/1971 | Goldsworthy . |
| 3,653,861 | 4/1972 | Stalego et al. . |
| 3,670,348 | 6/1972 | Irwin . |

(List continued on next page.)

FOREIGN PATENT DOCUMENTS

| | | |
|---|---|---|
| 0190011 | 8/1986 | European Pat. Off. . |
| 0196194 | 10/1986 | European Pat. Off. . |
| 2141853 | 3/1973 | Germany . |
| 110043 | 1/1968 | United Kingdom . |
| 9512553 | 5/1995 | WIPO . |

OTHER PUBLICATIONS

Derwent World Pat. 1994 Derwent Publ. Ltd. Japan 74020924.

Paul Fibers From Polymer Blends (1978) pp. 192–201.

*Primary Examiner*—Richard Weisberger
*Attorney, Agent, or Firm*—C. Michael Gegenheimer; Curtis B. Brueske

[57] ABSTRACT

An irregularly shaped glass fiber is provided which enjoys improved resiliency, and openness in pack structures. Wool packs and other wool portions having such irregularly shaped fibers may be processed directly through needling to form a non-woven material without intervening steps such as carding or blending of fibers which accompany conventional glass fiber processing operations. In a further aspect of the invention, a non-woven material including irregularly shaped fibers in a generally continuous wool tow is produced by "unwinding" a fiberglass wool pack collected by a direct forming method. Product applications include simplified, lower cost processing, and new uses of the irregularly shaped fibers produced by rotary fiberization in filtration elements, sorbants, gaskets, packings, shingles, composite structural elements, furnishings, textiles, yarns, and blown-in insulation systems.

11 Claims, 7 Drawing Sheets

U.S. PATENT DOCUMENTS

| | | |
|---|---|---|
| 3,791,806 | 2/1974 | Koizumi et al. . |
| 3,824,086 | 7/1974 | Perry et al. . |
| 3,850,601 | 11/1974 | Stapleford . |
| 3,865,540 | 2/1975 | Loeffler . |
| 3,881,903 | 5/1975 | Stalego . |
| 3,895,896 | 7/1975 | White et al. . |
| 3,900,302 | 8/1975 | Langlois et al. . |
| 3,966,533 | 6/1976 | Goldsworthy et al. . |
| 3,981,708 | 9/1976 | Loettler et al. . |
| 3,999,971 | 12/1976 | Drummond . |
| 4,145,199 | 3/1979 | Russell . |
| 4,162,190 | 7/1979 | Ashworth . |
| 4,167,404 | 9/1979 | Loettler . |
| 4,168,959 | 9/1979 | Loettler . |
| 4,184,643 | 1/1980 | McCort . |
| 4,201,247 | 5/1980 | Shannon . |
| 4,203,774 | 5/1980 | Battigelli et al. . |
| 4,296,164 | 10/1981 | Bemis et al. . |
| 4,347,985 | 9/1982 | Simpson . |
| 4,358,502 | 11/1982 | Dunbar . |
| 4,366,927 | 1/1983 | Kielmeyer . |
| 4,373,005 | 2/1983 | Goodwin . |
| 4,381,330 | 4/1983 | Gotomyo et al. . |
| 4,387,180 | 6/1983 | Jen et al. . |
| 4,396,722 | 8/1983 | Rapp . |
| 4,463,048 | 7/1984 | Dickson et al. . |
| 4,478,624 | 10/1984 | Battigelli et al. . |
| 4,486,211 | 12/1984 | Monaghan . |
| 4,541,884 | 9/1985 | Cogswell et al. . |
| 4,542,044 | 9/1985 | Gano et al. . |
| 4,543,690 | 10/1985 | Potter . |
| 4,555,447 | 11/1985 | Sielott et al. . |
| 4,674,271 | 6/1987 | Bird . |
| 4,682,523 | 7/1987 | Johnson et al. . |
| 4,707,399 | 11/1987 | Rambosek . |
| 4,744,810 | 5/1988 | Bahigelli et al. . |
| 4,756,957 | 7/1988 | Kielmeyer . |
| 4,829,738 | 5/1989 | Moss . |
| 4,842,667 | 6/1989 | Thorsted, Jr. . |
| 4,842,928 | 6/1989 | Kielmeyer . |
| 4,853,021 | 8/1989 | Soszka et al. . |
| 4,863,502 | 9/1989 | Schlarhter . |
| 4,909,817 | 3/1990 | Gill et al. . |
| 4,983,453 | 1/1991 | Beall . |
| 5,001,005 | 3/1991 | Bianpied . |
| 5,035,936 | 7/1991 | Dockrill et al. . |
| 5,051,123 | 9/1991 | Nurmi . |
| 5,055,428 | 10/1991 | Porter . |
| 5,071,793 | 12/1991 | Jean et al. . |
| 5,075,353 | 12/1991 | Hashimoto et al. . |
| 5,102,728 | 4/1992 | Gay et al. . |
| 5,112,678 | 5/1992 | Gay et al. . |
| 5,143,582 | 9/1992 | Arkens et al. . |
| 5,164,342 | 11/1992 | Muralidhar et al. . |
| 5,219,656 | 6/1993 | Klett et al. . |
| 5,268,015 | 12/1993 | Furtak et al. . |
| 5,367,849 | 11/1994 | Bullock . |
| 5,431,992 | 7/1995 | Houpt et al. . |

PROCESSING METHODS AND PRODUCTS FOR IRREGULARLY SHAPED BICOMPONENT GLASS FIBERS

BACKGROUND OF THE INVENTION

The present invention relates to the processing of glass fiber wool and products therefrom, and more particularly, to methods for processing and products made from irregularly shaped glass fibers.

Conventional glass fibers are useful in a variety of applications including reinforcements, textiles, and acoustical and thermal insulation materials.

Continuous glass fibers are typically produced via bushings for reinforcement and textile applications. Such fibers are typically made of many glass filaments held together by sizing. The glass fibers are often further processed by combining them into continuous strands, yarns and rovings, or by chopping the glass fibers into preselected lengths defined by the end user. Where chopped, the resulting short, straight fiber segments may be mixed with other materials, wet processed into mats such as are used for shingles, or otherwise treated for use. While bushings have significant operational lifetimes, their throughput is limited relative to rotary fiberizing techniques for producing glass fibers.

Short, straight fibers typical of acoustic and thermal insulation materials are made by rotary fiberizing techniques and are interconnected by binders. In such techniques, molten glass is delivered from a furnace to an orificed centrifuge, commonly referred to as a spinner. Fibers produced by the spinner are drawn downward by a blower. A binder, which is required to bond the fibers into a wool product, is sprayed onto the fibers as they are drawn downward. The fibers are then collected and formed into a wool pack. The resulting materials suffer from non-uniform material distribution, the expense of binder, and costs to treat effluent and exhaust air to protect the environment from the impact of organic compounds in the binder.

In addition to insulation materials, other wool products are produced from the wool pack by further compressing and heat setting the wool into boards or panels. Alternately, the wool may be blended with other natural and synthetic fibers to form non-woven materials, and thereafter carded or combed to open up the fiber pack for further processing, such as needling. Carding and combing tends to align the fibers. The blended fibers serve both to open the glass fiber matrix and make the glass fibers amenable to needling by 'lubricating' the needling action.

Conventional glass fibers, whether continuous, chopped, or in wool packs have found their way into a wide variety of products. It is desirable to further improve the characteristics of products including glass fibers, and to find new uses for glass fibers which take advantage of glass fiber properties.

SUMMARY OF THE INVENTION

In accordance with the present invention an irregularly shaped glass fiber is provided which enjoys improved resiliency, and openness in pack structures. Packs, batts or other assemblies, generally referred to herein as portions, include irregularly shaped glass fibers which are entangled and require no binder. As set forth in accordance with the present invention, portions of the wool pack having irregularly shaped fibers may be processed directly without intervening steps which are required in conventional glass fiber processing operations. That is, a wool pack of the irregularly shaped glass fibers may be needled without the precursor steps of carding, blending with other fibers, or lubricating, otherwise required with conventional straight glass wools. The openness and resiliency of the irregularly shaped glass fibers further allows the wool fibers to resist abrasion and needling damage by deflection rather than breakage, producing less dust during processing. Nonetheless, the open structure of the irregularly shaped glass fibers improves the ease with which carding and blending operations are performed, when such are desired. Further, irregularly shaped glass fibers produced in accordance with the present invention have a more uniform weight distribution, so that non-woven materials produced by needling or other processing exhibit more uniform properties. As a result, a series of articles including irregularly shaped fibers may be produced at lower cost, or processed with less effort, with varied and improved performance characteristics.

Accordingly, the present invention provides a method for producing non-woven material from irregularly shaped glass fibers including the steps of providing a portion of irregularly shaped glass fiber wool, needling the irregularly shaped glass fiber wool, and thereby producing a non-woven material substantially comprised of irregularly shaped glass fibers. Preferably, the method is performed with irregularly shaped, bi-component glass fibers produced by rotary fiberization, and requires no precursor processing such as carding or blending.

The present method can include the steps of heating the glass fiber wool prior to the step of needling and relaxing the irregularly shaped glass fibers used in the wool.

The present invention, thus, provides for a non-woven material comprised of an uncarded, needled glass fiber wool including irregularly shaped glass fibers, preferably bi-component glass fibers unblended with other fibers. Materials including needled, irregularly shaped glass fibers in accordance with the present invention demonstrate not only the high temperature, smoke and chemical resistance of glass, and dimensional stability, but also a resiliency, high loft, resistance to tear, and soft felt-like feel (i.e. soft "hand"). The choice of needles, repetitive needling, needling from one or both sides, and location of needling can vary these characteristics, making numerous product applications possible.

By way of example and not limitation, product applications of the resulting woven and non-woven materials include use of irregularly shaped glass fiber materials in filtration elements, sorbants, gaskets, packings, shingles, composite structural elements, furnishings, textiles, yarns, and blown-in insulation systems.

Finally, in a further aspect of the present invention, a non-woven material is provided including irregularly shaped fibers in a generally continuous wool tow. The generally continuous tow is produced by "unwinding" a fiberglass wool pack collected by a direct forming method. In the direct forming method, irregularly shaped glass fibers are collected such that a generally spiral fiber relationship in the veil of fibers is captured and then generally maintained in the wool pack. This generally continuous wool tow may be further processed in numerous ways to form yarns, textiles, packings, reinforcements, and blown-in insulation.

A still further feature of the continuous tow is that the generally continuous tow may be transported between operating stations through tubes blown or drawn by air movement induced by fans or vacuum.

The production of a generally continuous tow by "unwinding" a fiberglass wool pack collected by a direct forming method may further be applied in a portable blowing wool system comprising a wool pack of irregularly shaped glass fibers collected by direct form methods, which may be unwound and cubed on site, and blown into spaces to be insulated.

DETAILED DESCRIPTION OF THE PREFERRED EMBODIMENTS

The methods of the present invention may be used to process wool packs of irregularly shaped long glass fibers into further products and materials as representatively shown in FIGS. 1 through 12.

Figure 1:
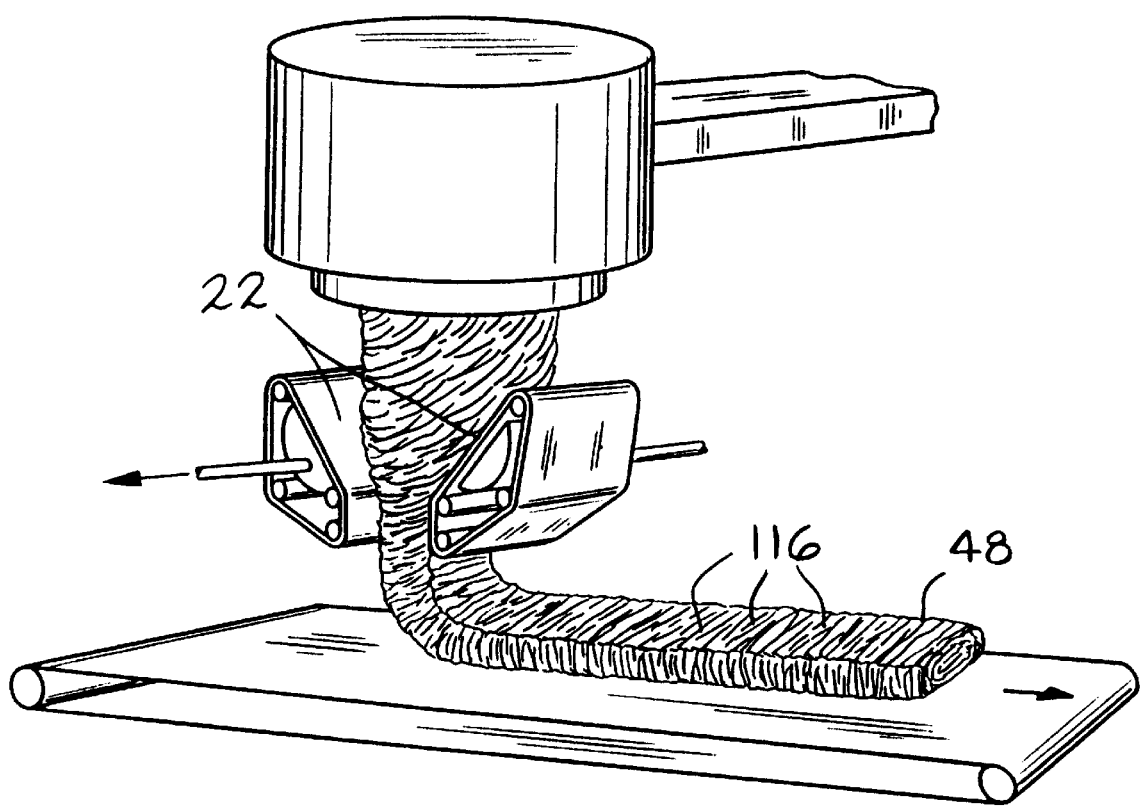
FIG. 1 is a schematic perspective view of a direct forming method of collecting irregularly shaped glass fibers in accordance with the present invention.
Figure 2:
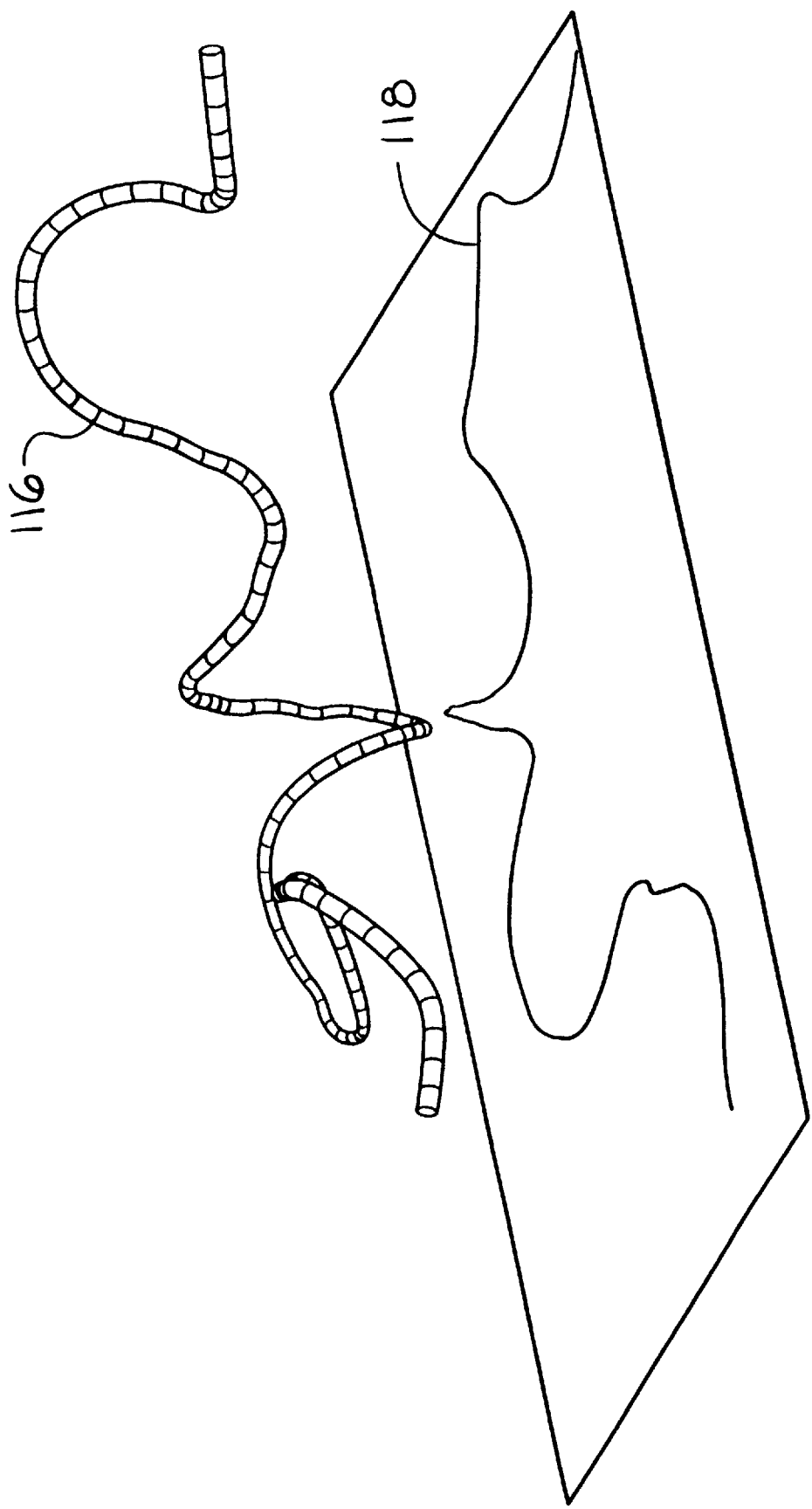
FIG. 2 is a schematic perspective view of an irregularly shaped glass fiber in accordance with the present invention.

Referring to FIG. 1, irregularly shaped glass fibers 116 are provided which enjoy improved resiliency, and openness in pack structures 48. Packs, batts or other assemblies, generally referred to herein as portions 148, include irregularly shaped glass fibers 116 which are entangled, and require no binder. The fiber structure and methods of manufacturing wool packs 48 are set forth in commonly assigned and co-pending U.S. patent application Ser. Nos. 08/148,098, filed Nov. 5, 1993, now U.S. Pat. No. 5,432,992, issued Jul. 11, 1995; 08/240,428, filed May 10, 1994; 08/236,061, filed May 2, 1994; and 08/236,067 filed May 2, 1994; all of which are incorporated by reference herein in their entirety.

Referring to FIG. 1, the preferred process for producing a wool pack 48 (or portion 148) is shown in which long, irregularly shaped glass fibers 116 are collected upon opposing first conveyor surfaces 22. Referred to also as a direct form collection, the preferred process is best disclosed in greater detail in U.S. patent application Ser. No. 08/240,428, previously incorporated by reference. This method has the benefit of collecting the irregularly shaped fibers 116 with a generally spiral orientation in the wool pack 48. The irregularly shaped long glass fiber 116 is representatively shown in FIG. 2 along with its two-dimensional projection shadow 118, which illustrates the irregular shape or rotation along its length.

Figure 3:
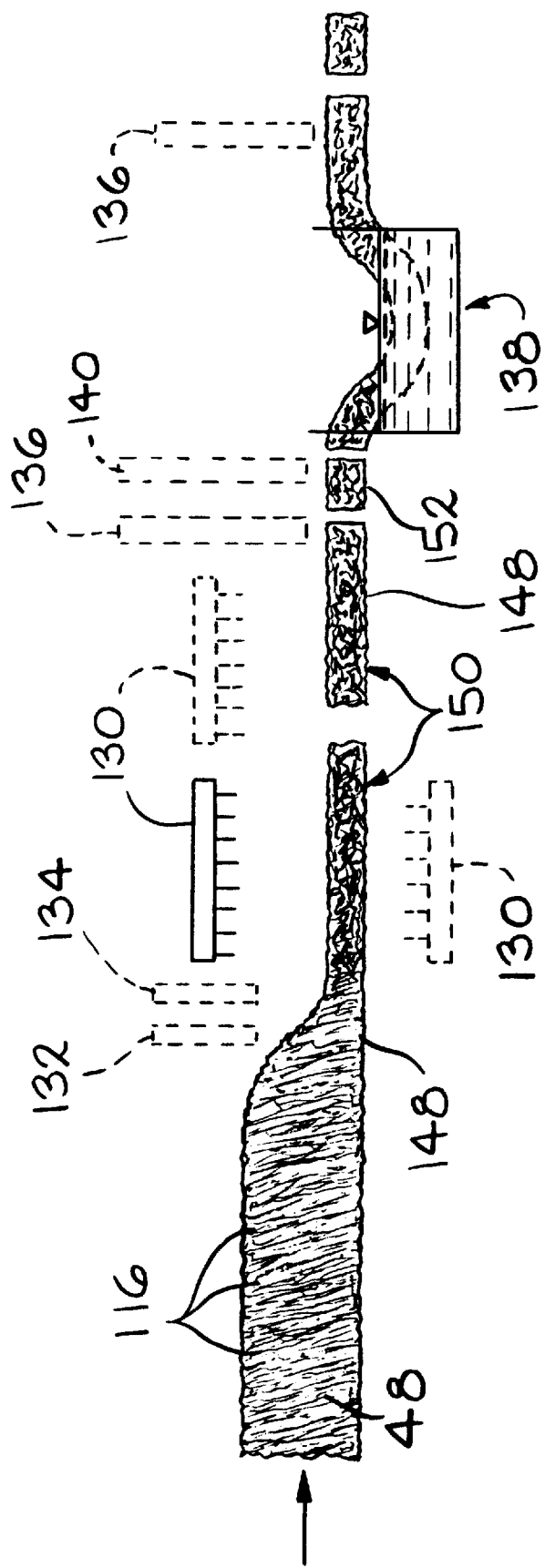
FIG. 3 is a schematic side view of various processing steps performed on a wool pack of irregularly shaped glass fibers in accordance with the present invention.

Referring now to FIG. 3, in accordance with the present invention, the wool portions 148 including irregularly shaped glass fibers 116 may be processed directly without intervening steps which accompany conventional glass fiber processing operations. That is, a wool portion 148 of the irregularly shaped glass fibers 116 may be needled, as generally indicated at 130, without the precursor steps of carding, blending with other fibers, or lubricating, otherwise required with conventional straight glass wools. The openness and resiliency of fibers 116 further allow them to resist abrasion and needling damage by deflection rather than breakage, producing less dust during processing. Nonetheless, the open structure of the irregularly shaped glass fibers 116 improves the ease with which carding and/or blending operations, generally indicated at 132 and 134 respectively, are performed, when such are desired. Such processes are preferably performed before needling, but could also follow needling 130.

Further, irregularly shaped glass fibers 116 produced in accordance with the present invention have a more uniform weight distribution, so that non-woven materials produced by needling or other processing exhibit more uniform properties. As a result, a series of articles including irregularly shaped glass fibers 116 are illustratively disclosed herein in FIGS. 3–12 which may be produced at lower cost, or processed with less effort, with varied and improved product performance characteristics.

Accordingly, the present invention provides a method for producing non-woven material 150 from irregularly shaped glass fibers 116 including the steps of providing a portion 148 of irregularly shaped glass fiber wool, needling the irregularly shaped glass fiber wool, thereby producing a non-woven material 150 substantially comprised of irregularly shaped glass fibers 116. Preferably, the method is performed with irregularly shaped, bi-component glass fibers produced by rotary fiberization, and requires no precursor processing such as carding or blending.

The present invention, thus, provides for a non-woven material 150 comprised of an uncarded, needled glass fiber wool including irregularly shaped glass fibers 116, preferably bi-component glass fibers unblended with other fibers. Non-woven materials 150 including needled, irregularly shaped glass fibers in accordance with the present invention demonstrate not only the high temperature and chemical resistance of glass, but resiliency, high loft, resistance to tear, and a soft felt-like feel (i.e. soft "hand"). The choice of needles, penetrations per square centimeter of material, line speed, vertical displacement of the needles, repetitive needling and needling from one or both sides, as representatively indicated in phantom at 130, can vary these characteristics, making numerous product applications possible.

As may be understood, elimination of carding 132 and/or blending steps 134 makes possible lower cost production of non-woven material which, further, exhibits beneficial characteristics of the irregular glass fibers 116 of the present invention in a resilient felt-like material. Due to the nature of the fiberizing and collection techniques incorporated by reference above, the needling 130 or other processes can proceed directly upon the wool pack 48 after production. Simply stated, a non-woven fabric material 150 may be produced in sheets 152 by a cutting or stamping process, indicated representatively at 136, as shown in FIG. 3.

Further processing in the way of applying a coating, saturant, or filler is representatively indicated at 138, and may include, as necessary for a particular coating, saturant or filler, or other surface treatment to include multiple steps such as heating, drying, or rinsing.

Figure 4:
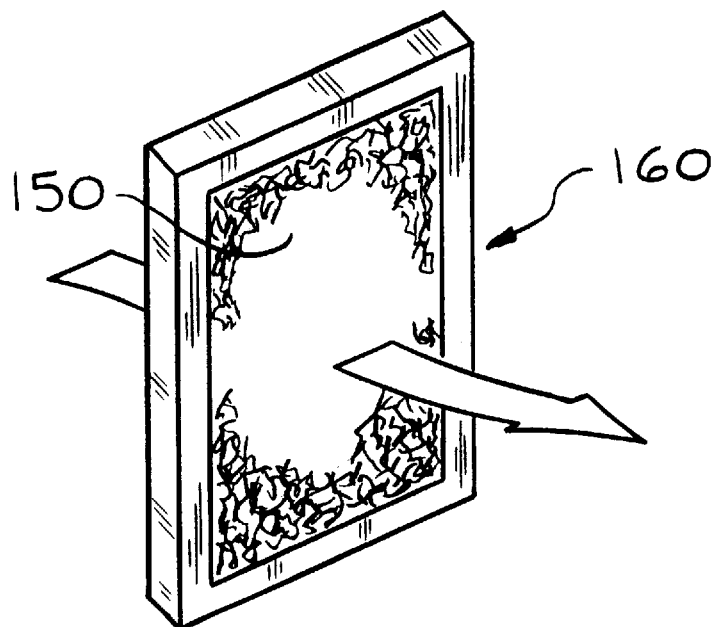
FIG. 4 is a schematic perspective view of a filtration element including needled irregularly shaped glass fibers embodied in a representative panel configuration.
Figure 5:
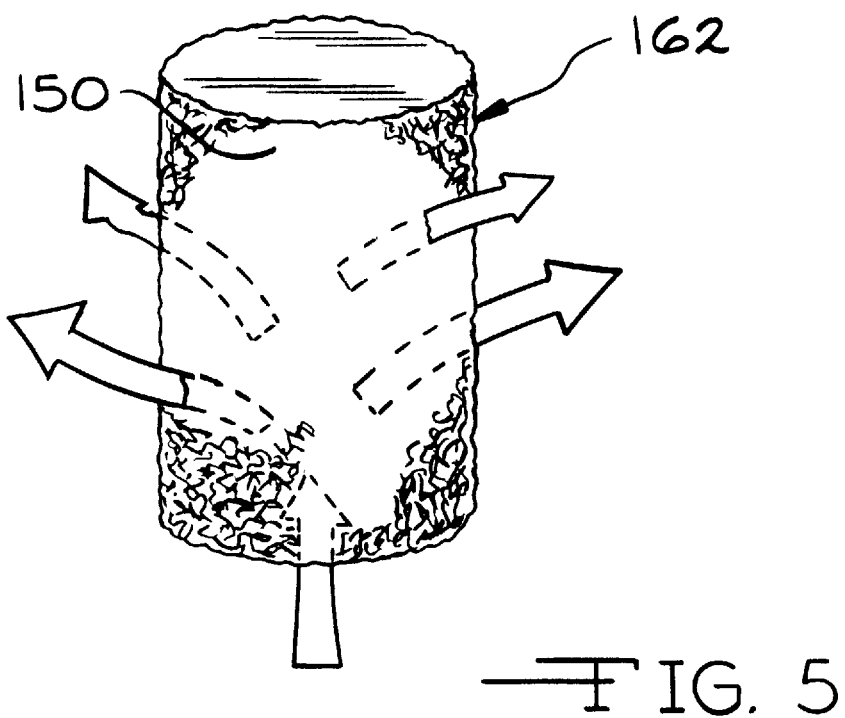
FIG. 5 is a schematic perspective view of a filtration element including needled irregularly shaped glass fibers embodied in a representative filter bag configuration.

Referring to FIGS. 4–7, illustrative product applications are shown. FIGS. 4 and 5 illustrate alternative filtration elements 160, 162 using the non-woven, felt-like material 150 of needled irregularly shaped glass fibers 116. The filtration element is illustratively configured as a panel 160 or a bag 162. Due to the fiber characteristics, filtration elements 160, 162 will exhibit generally uniform filtration characteristics throughout, and are capable of application in high temperature environments. In addition, surface treatments may be added (e.g. at 138) to provide increased surface area, or reaction sites for application-specific chemical species. In addition, sheets 152 of the non-woven material 150 may also serve as a sorbant material without further processing, or include a surface treatment to enhance sorbant properties of the wool portion, or form part of a composite sorbant material. One particular application of interest in this regard is its use as a sorbant for water-borne oil spills.

Figure 6A:
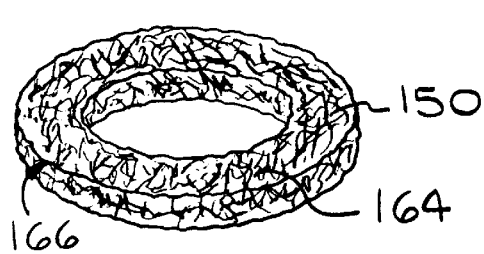
FIG. 6a is a schematic perspective view of a representative gasket including a resilient matrix of needled irregularly shaped glass fibers.
Figure 6B:
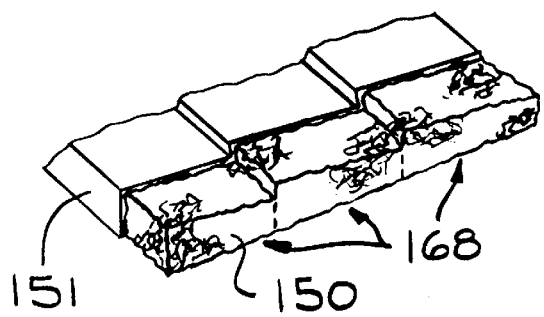
FIG. 6b is a schematic perspective view of a representative shingle including a matrix of irregular glass fibers needled to provide different thicknesses.
Figure 7:
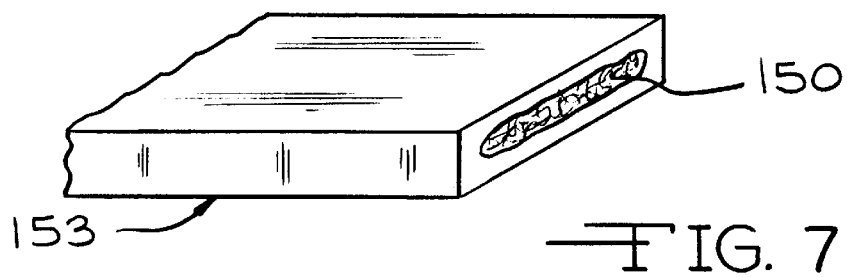
FIG. 7 is a schematic perspective view of a representative structural element having an inner core of irregularly shaped glass fibers.

With or without needling, the irregularly shaped glass fibers 116 in accordance with the present invention may be treated (as indicated generally at 138) with a sorbant or combined with a filler which penetrates into the fiber matrix to produce additional composite products. Referring now to FIG. 6a, a representative gasket 166 is made of a needled unwoven material 150 (as shown) or alternatively of an un-needled wool portion 148 in combination with a saturant 164 such as a closed cell foam. In accordance with the present invention, the resiliency and openness of the irregularly shaped fibers 116 in the needled wool material 150 provides to the combination needed recovery not present in the foam saturant, while the foam saturant 164 provides a sealing capability lacking in the more open fiber structure of the needled material 150. Similarly, in a reinforcements application, needled felts or un-needled wool portions may be used to reinforce a filler material. Needled, unwoven wool material 150 including the irregularly shaped fibers 116 of the present invention may be used, for example, with an asphalt filler 151 for a high loft roofing product. In this regard, needling may be varied across the width of the material so that when cut to form separate shingles 168, areas have different thicknesses, as shown in FIG. 6b. Alternatively, needled or un-needled wool portions 148 may be used, for example, with a polyester or other polymer fillers to provide reinforcement for a substantially rigid composite structural element. As representatively shown in FIG. 7, needled wool materials 150 including the irregularly shaped fibers 116 may form the core of an extruded or pultruded structural element 153.

Figure 8A:
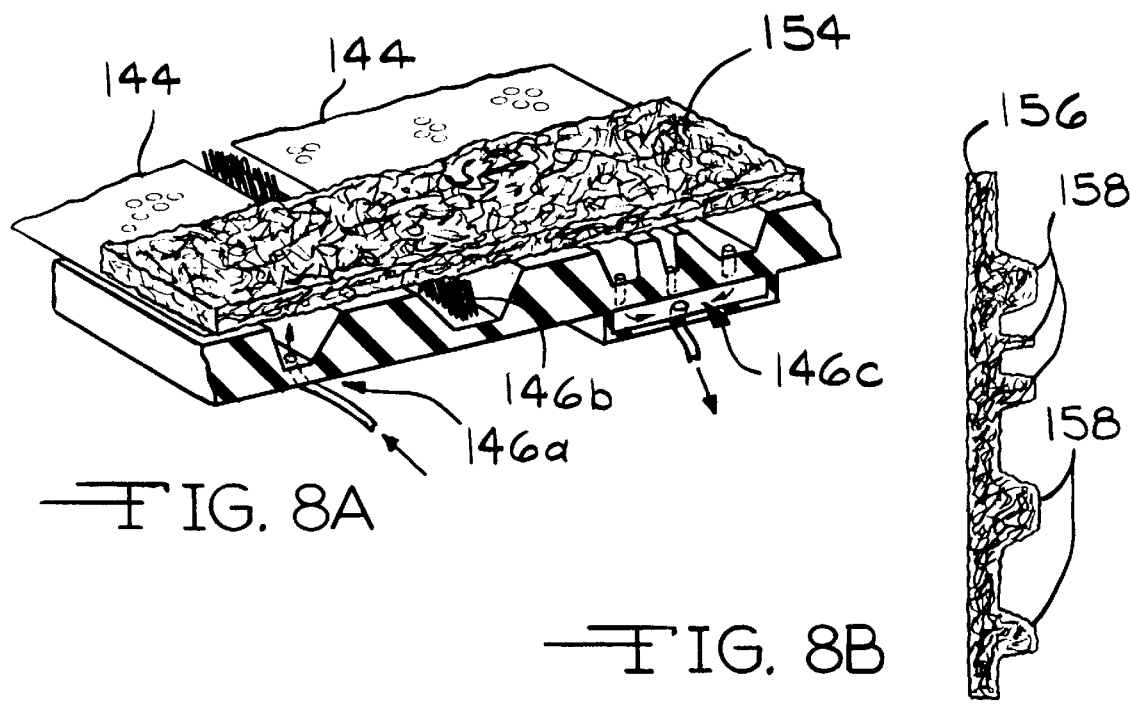
FIG. 8a is a schematic perspective view of a representative texturizing process applied to a mat of irregular glass fibers in accordance with the present invention.
Figure 8B:
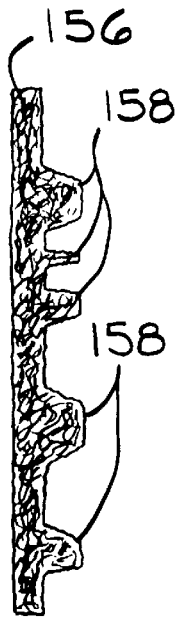
FIG. 8b is a schematic cross sectional view of a texturized mat of irregularly shaped glass fibers

In addition to needling, carding and blending processes 130, 132, 134, the irregularly shaped fiber 116 of the present invention may be processed by chopping into fiber segments for use, as indicated at 140 in FIG. 3. Such chopping follows rotary fiberization or even may follow needling, to prepare the irregularly shaped fibers 116 for use as a reinforcement. In some applications, the fibers 116 may alternatively be carded or combed to break down the pack structure. Regardless, as in wet lay techniques known for straight fibers, the irregularly shaped fibers 116 may then be wetted, deposited, and dried to form a mat 154 of irregularly shaped fibers 116, as representatively shown in FIG. 8a. Such a mat 154 could be used as a precursor for shingles 168, as well as an underlying matrix for furnishings such as wall coverings, floorings, and ceiling tiles which are fire, smoke or chemical resistant. As shown in FIGS. 8a and 8b, the resiliency and openness of the irregularly shaped glass fiber 116 makes possible texturing the mat structure to provide a variety of looks previously unavailable with conventional fiber substrates.

As shown in FIG. 8a, a conveyor 144, such as a foramenous or split conveyor, may be used to carry the mat over a texturizing station where air jets 146a, brushes 146b, vacuum 146c or other texturizing means causes irregular fibers 116 in the mat surface to release and create a textured line 158. Subsequent application of a coating, saturant or filler (representatively shown in FIG. 3) such as used for ceiling tiles, wall coverings, floorings, shingles or gaskets, will produce a textured product. A representative cross section of the texturized mat 156 is shown in FIG. 8b.

Figure 9:
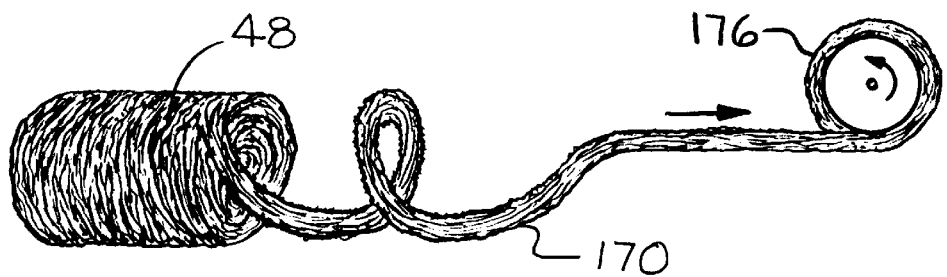
FIG. 9 is a schematic perspective view of a generally continuous tow of irregularly shaped wool fibers being produced from a wool pack collected by direct forming methods.

Finally, in a further aspect of the present invention, a non-woven material 150 including irregularly shaped fibers 116 is provided in a generally continuous wool tow 170, shown in FIG. 9. The generally continuous tow 170 is produced by "unwinding" a fiberglass wool pack 48 collected by a direct forming method, such as that described in U.S. patent application Ser. No. 08/240,428, incorporated by reference herein. In the direct forming method, irregularly shaped glass fibers 116 are collected such that a generally spiral fiber relationship in the veil of fibers is captured and their spiral orientation is generally maintained in the wool pack 48. As the direct forming method may also be used to collect long straight fibers from a rotary fiberizer, the "unwinding" discussed herein is understood to be capable of performance on batts of such material, albeit with added difficulty in maintaining the continuous tow due to the reduced fiber entanglement. Nonetheless, the generally continuous wool tow 170 may be further processed in numerous ways, and rolled onto a core 176.

The tow 170 may be needled without further processing to create a non-woven fabric strip, or further processed by carding or blending; by cutting, chopping, or stamping; or by addition of a coating, saturant or filler in like fashion as set forth in FIG. 3 and discussed above.

Figure 10:
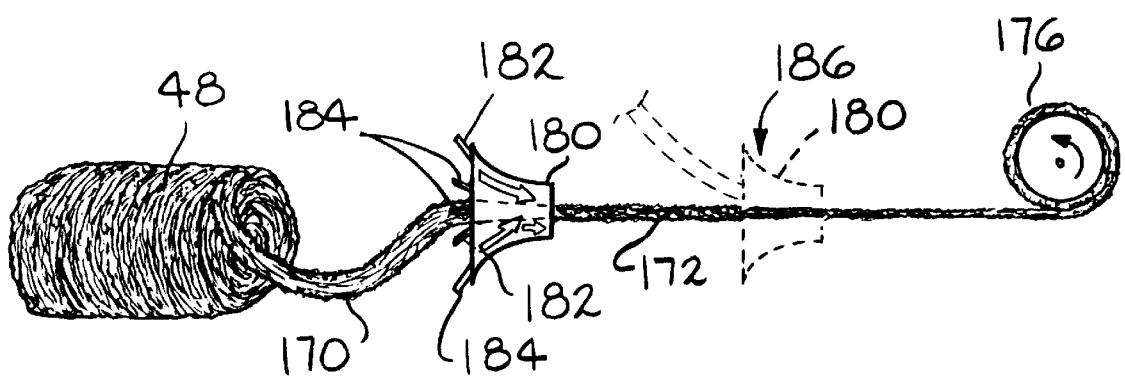
FIG. 10 is a schematic perspective view of a method for making yarn from a generally continuous tow of irregularly shaped wool fibers.

Moreover, the generally continuous wool tow 170 of irregularly shaped fibers 116 may be fed one or more times through an air driven venturi tube 180, shown in FIG. 10. Such a venturi tube 180 has air jets 182 providing an axially aligned air flow, and acts as an air amplifier. Venturi tubes 180 are commercially available, such as Model No. 218 Vortex tube from ITW Vortec Corp., Cincinnati, Ohio. The venturi tube 180 may be used to simply assist in unwinding the tow from a wool pack 48. However, when modified in accordance with the present invention, the venturi tube further includes a plurality of tangentially targeted air jets 184 inducing a spiraling vortex of air. Given the axial air flow component and the spiraling vortex, the venturi tube 180 induces a longitudinal twist in the tow 170 driven therethrough, resulting in a yarn 172. Yarns of varying openness can be made from wool fibers, straight or preferably irregularly shaped, depending on the degree of twist imparted to the tow 170. Alternately, the yarn 172 may be formed by mechanical means, however, air means are preferred for reduced impact on the entanglement of irregularly shaped fibers and the integrity of the tow 170.

In addition, with continued reference to FIG. 10, the yarn 172 thus formed may be further combined (indicated generally at 186) with other yarns of like or different fibers by mechanical twisting means, or by a subsequent pass through the venturi tube 180, to yield combined yarn properties for specific applications. The yarns of irregularly shaped glass fibers, alone or in combination with other fibers, may then be used as carriers or reinforcements, or in additional textile operations including production of woven textiles.

Figure 11:
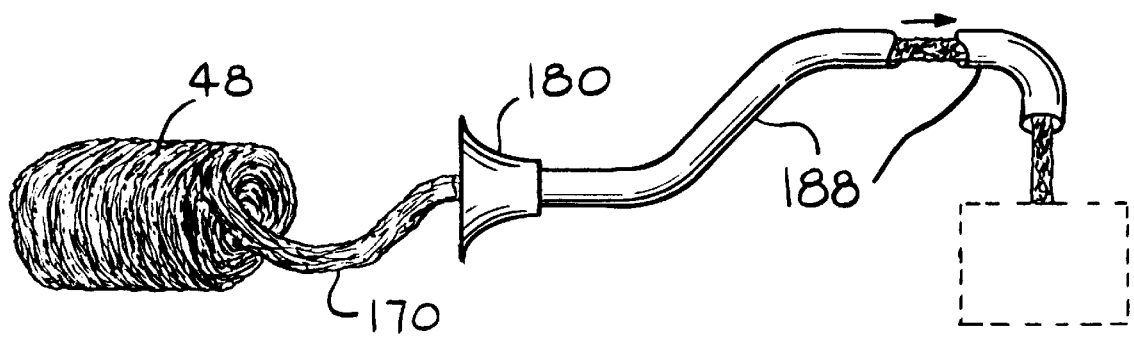
FIG. 11 is a schematic perspective view of a generally continuous tow and a distribution system therefor in accordance with the present invention.

Referring now to FIG. 11, in accordance with the present invention, a still further feature of the continuous tow 170 is that the generally continuous tow 170 may be transported between operating stations in a manufacturing facility through transport tubes 188. The tow may be blown or drawn by air movement induced by fans or vacuum or venturi tubes. Thus, from the fiberizing station, wool packs 48 of irregularly shaped fibers 116 collected by direct forming methods as disclosed herein may be "unwound" into a tow 170 and transported for further processing at remote stations without manual intervention, conventional conveyors or other mechanical transport. Preferably the transport pipes 188 are built as overhead systems requiring a minimum of plant floor space.

Figure 12:
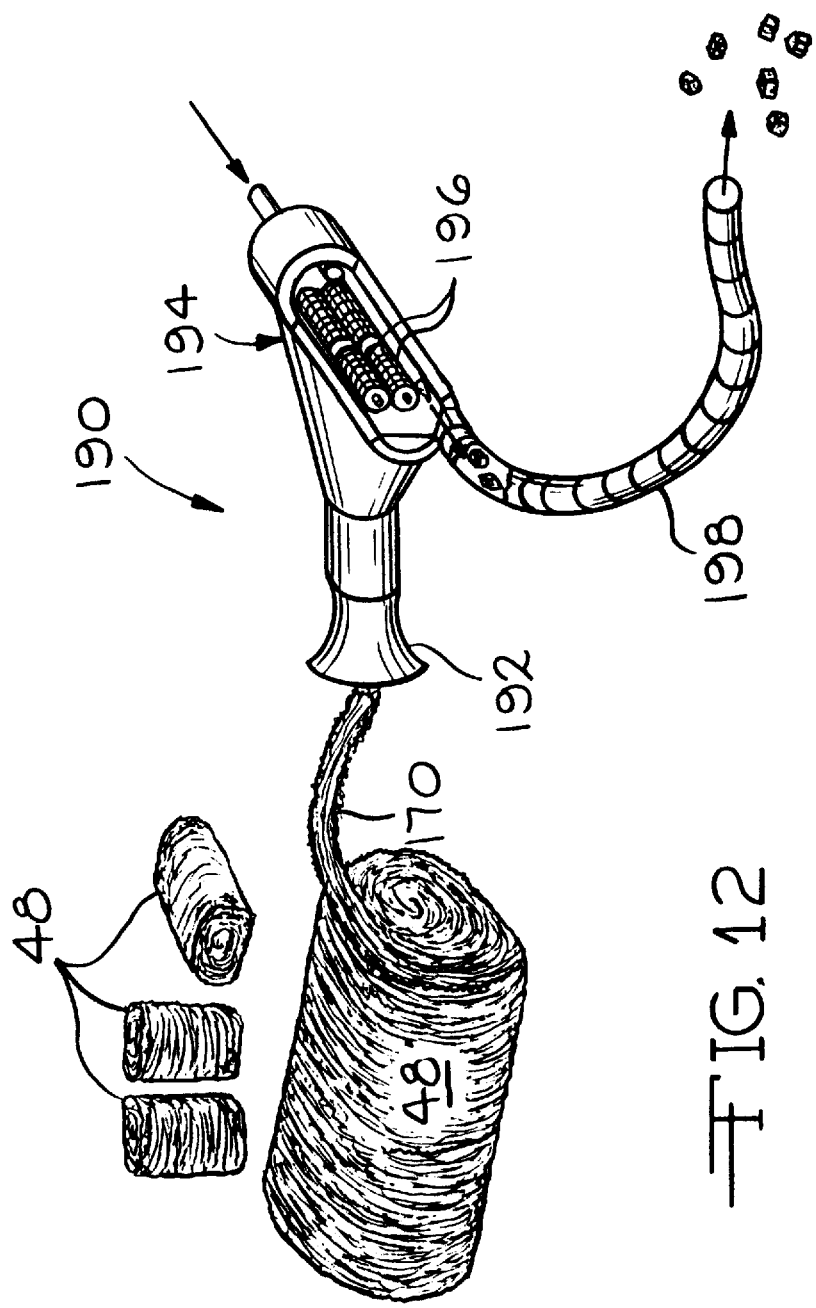
FIG. 12 is a schematic perspective view of a portable blown in insulation system in accordance with the present invention.

The production of a generally continuous tow 170 by "unwinding" a fiberglass wool pack 48 collected by a direct forming method may be further applied in providing a portable blowing wool apparatus 190, shown in FIG. 12, comprising a wool pack 48 of irregularly shaped glass fibers 116 collected by direct form methods. In accordance with the present invention, a highly compressed wool pack 48 is unpacked on site, and the tow 170 drawn therefrom by means of a standard venturi tube 192. The tow 170 is thereafter passed through a cubing element 194 which cuts the tow 170 into cubes or pieces, which are then preferably blown by compressed air into spaces to be insulated. The cubing element 194 preferably includes two hollow cutting cylinders 196. The cubes are preferably 1.2 to 2.5 cm in any of the width, length or height directions. Once cut, the cubes drop into the center of the cylinders 196 from where they are blown by compressed air from an air compressor (not shown), or alternatively, by a fan or blower, through the duct 198. This portable system allows an installer to take advantage of the high compressibility of the irregularly shaped fiber 116, reduce capital costs of trucks and hoses, and perform a cleaner on-site procedure.

Having described the invention in detail and by reference to the preferred embodiments thereof, it will be apparent that modifications and variations are possible without departing from the scope of the invention which is defined in the appended claims.

We claim:

1. A method for producing non-woven material from irregularly shaped, bi-component glass fibers comprising the steps of:

providing a portion of irregularly shaped, bi-component glass fiber wool;

needling said irregularly shaped glass fiber wool; and thereby producing a non-woven material substantially comprised of irregularly shaped glass fibers.

2. The method of claim 1 wherein said step of needling is performed upon at least surface of said wool portion.

3. The method of claim 1 wherein said step of providing comprises producing said portion of irregularly shaped glass fibers by rotary fiberization.

4. The method of claim 3 wherein said step of providing further includes collecting said portion of irregularly shaped glass fibers by a direct forming method including the steps of:

capturing said irregularly shaped fibers in a generally spiral orientation; and forming a wool pack of fibers while generally maintaining the spiral orientation of said fibers.

5. The method of claim 3 wherein said step of providing comprises producing said portion as a batt of irregularly shaped glass fibers.

6. The method of claim 1 further including the steps of:

heating said glass fiber wool prior to the step of needling; and relaxing said glass fibers.

7. The method of claim 1 further wherein said step of needling is not preceded by a processing step selected from the group consisting of: carding, blending of other fibers, adding lubricant, and combinations thereof.

8. The method of claim 1 further including the steps of treating said wool portion with a saturant after needling.

9. The method of claim 8 further including the step of bonding said non-woven material to a flexible backing prior to said step of treating with a saturant.

10. The method of claim 1 further including the steps of:

separating groups of said irregularly shaped glass fibers; and producing therewith a mat of said irregularly shaped glass fibers.

11. The method of claim 10 further including the step of texturizing at least one surface of said mat.

* * * * *